Oct. 31, 1961 D. R. YOUNG 3,007,139
CIRCUIT ELEMENT FOR USE IN LOGICAL AND MEMORY CIRCUITS
Filed May 22, 1956 2 Sheets-Sheet 1

INVENTOR.
DONALD R. YOUNG
BY John E. Dougherty, Jr.
AGENT

Oct. 31, 1961 D. R. YOUNG 3,007,139
CIRCUIT ELEMENT FOR USE IN LOGICAL AND MEMORY CIRCUITS
Filed May 22, 1956 2 Sheets-Sheet 2
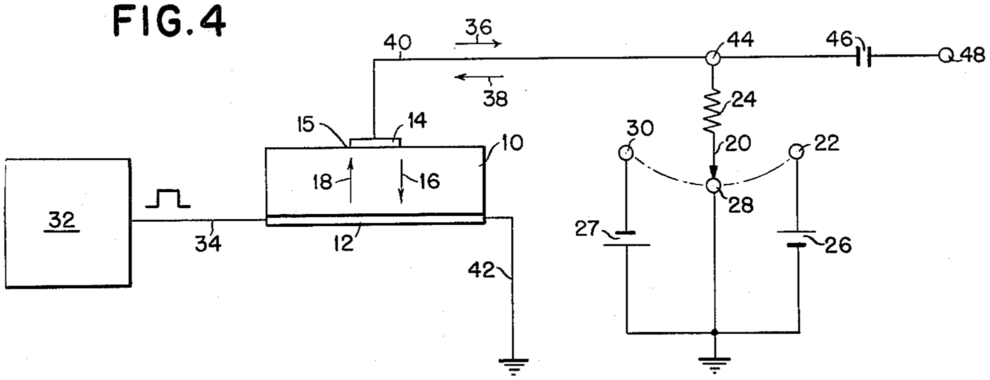
FIG. 5
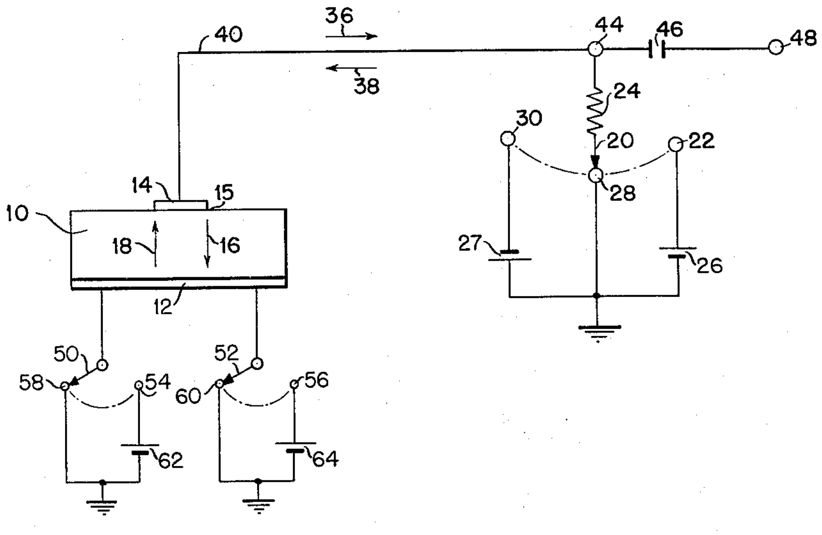
FIG. 6
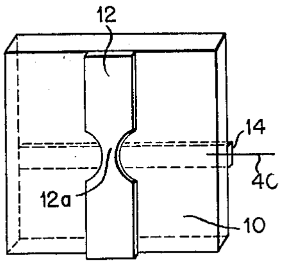

3,007,139

CIRCUIT ELEMENT FOR USE IN LOGICAL AND MEMORY CIRCUITS

Donald R. Young, Poughkeepsie, N.Y., assignor to International Business Machines Corporation, New York, N.Y., a corporation of New York Filed May 22, 1956, Ser. No. 586,403
18 Claims. (Cl. 340—173.2)

The present invention relates to logical and storage circuits which include ferroelectric capacitors and more particularly to circuits which in their operation utilize the pyroelectric properties of the crystalline dielectrics of ferroelectric capacitors.

The pyroelectric effect may be defined as the change in electrical charge which may be produced in certain types of materials by subjecting them to a change in temperature. This change in charge, within a material having pyroelectric properties, causes a current to flow which current is termed pyroelectric current. Crystals which have a reversible spontaneous polarization characteristic, and are therefore ferroelectric, are among the materials which exhibit pyroelectric properties. Such crystals, when subjected to changes in temperature, undergo a change in their remanent polarization and the magnitude of the pyroelectric current which accompanies this change in polarization is dependent principally on the rate at which the temperature of the crystalline material is changed. As a result it has been found possible to produce appreciable pyroelectric currents with relatively small temperature changes which occur at a high rate. These principles, as well as a method of producing detectable pyroelectric currents, indicative of the state of polarization of a barium titanate capacitor, by focusing a beam of light on the crystalline dielectric are discussed in an article by A. G. Chynoweth entitled, "Dynamic Method for Measuring the Pyroelectric Effect with Special Reference to Barium Titanate" which appeared in the Journal of Applied Physics; volume 27, Number 1; pages 78–84; January 1956.

The present invention is concerned primarily with the provision of improved ferroelectric capacitor circuitry for use in logical and storage systems such as are found in present day computing and data handling equipment. A prime object of the present invention is to provide an improved pyroelectric method of nondestructively interrogating the state of polarization of ferroelectric memory capacitors.

A further object is to provide a logical "EXCLUSIVE OR" circuit which in operation utilizes the pyroelectric properties of the crystalline dielectric of a ferroelectric capacitor.

These objects are achieved, in the main, by utilizing electrode heating to produce pyroelectric current in the dielectric of a ferroelectric capacitor. Such capacitors are particularly adaptable for use as memory elements since they are capable of assuming two different states which are distinguishable since the direction of polarization in the ferroelectric dielectric when in one state, differs from the direction of polarization when in the other state. For the illustrative purposes of this disclosure, the description of the operation of the circuits embodying the invention is made with reference to capacitors having barium titanate dielectrics. According to one embodiment of the invention, a ferroelectric capacitor memory circuit is disclosed wherein means are provided for applying electric fields sufficient to cause the memory capacitor to assume one or the other of two stable states of remanent polarization in opposite directions, which states may be representative of different values of binary information. Interrogation of the capacitor is accomplished nondestructively by applying a signal current to one electrode of the crystal. The resistance offered by the electrode results in an $I^2R$ loss involving the evolution of heat which is effective to change the temperature of the crystalline dielectric thereby producing a pyroelectric current. The output is developed across an impedance element connected to the other electrode of the capacitor. Since the direction of current flow is dependent only upon the initial state of polarization of the crystal, the polarity of the output pulse is independent of the polarity of the input pulse and indicates which of the two remanent states the capacitor is in when interrogated. Upon termination of the interrogation signal, the capacitor reassumes its original remanent state of polarization and thus the interrogation is nondestructive.

A second embodiment of the invention discloses an "EXCLUSIVE OR" circuit in which a pair of input terminals are connected to opposite ends of one electrode of a ferroelectric capacitor and an output circuit is connected to the other electrode. When either input terminal is pulsed exclusively, a current is caused to flow through the input electrode thereby heating the crystalline dielectric and causing a pyroelectric current to flow through the crystal to the output circuit. When pulses of equal magnitude and like polarity are coincidently applied to the input terminals there is no voltage drop across the electrode and thus no heating current flows therethrough. As a result, no pyroelectric current is produced, and the coincident energization of both inputs does not produce any current in the output circuit. Since the direction of current flow in the output circuit is dependent only upon the initial state of polarization of the crystal, the outputs produced for a given state of remanent polarization are unipolar regardless of the polarity of the input pulses. Since the crystal reverts to its initial state of polarization after the application of input pulses, exclusively or coincidently, there is no need to reset the circuit between successive logical operations.

Thus another object of the present invention is to provide improved ferroelectric circuitry in which pyroelectric currents are produced in the crystalline dielectric of a ferroelectric capacitor by passing a heating current through one electrode of the capacitor.

A further object is to provide an improved ferroelectric "EXCLUSIVE OR" circuit capable of operation with input pulses of either polarity without the need of a resetting between successive logical operations.

Another object is to provide a memory element which may by logically and nondestructively interrogated.

Other objects of the invention will be pointed out in the following description and claims and illustrated in the accompanying drawings, which disclose, by way of example, the principle of the invention and the best mode, which has been contemplated, of applying that principle.

In the drawings:

FIG. 4 is a diagrammatic showing of a memory circuit constructed according to the principles of the invention.

FIG. 5 is a diagrammatic showing of an "EXCLUSIVE OR" circuit constructed according to the principles of the invention.

FIG. 6 depicts a ferroelectric crystal with electrodes attached to form a ferroelectric capacitor particularly suitable for use in circuitry embodying the invention.

Figure 1:
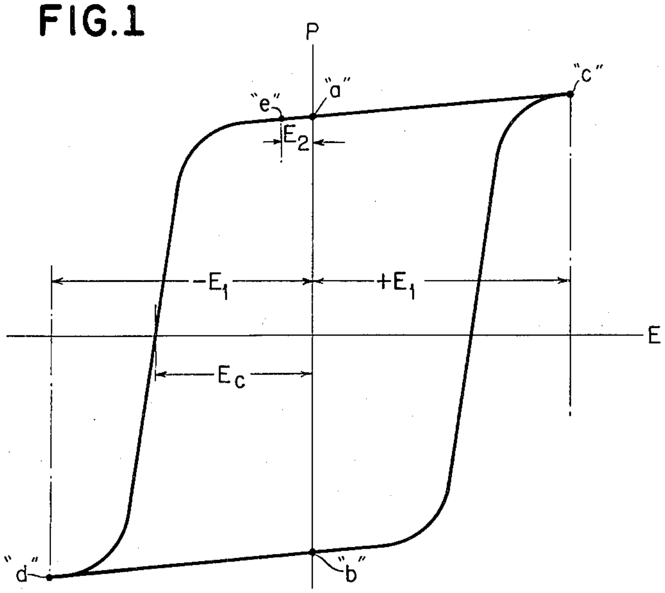
FIG. 1 is a diagrammatic representation of a hysteresis loop for a crystal of barium titanate.

There is shown in FIG. 4 a diagrammatic illustration of a ferroelectric capacitor memory circuit which embodies the principles of the present invention. A crystal of barium titanate 10 has a transverse electrode 12 affixed to one face and a longitudinal electrode 14 attached to its other face. These electrodes 12 and 14 together with the barium titanate between them at their intersection form the actual memory capacitor which is, in FIG. 4, designated 15. The capacitor, thus formed, is of the type which exhibits a hysteresis loop such as is shown in FIG. 1, and is capable of storing binary information since, by the proper application of electric fields, it can be caused to assume either of the remanent states of polarization indicated at "*a*" and "*b*" of the figure.

Assume that the remanent state "*a*" is to be the binary one representing state and represents a remanent state of polarization in the direction indicated, in FIG. 4, by arrow 16 and that the state "*b*" is the binary zero state and represents remanence in the direction indicated by arrow 18. With this assumption in mind, it may be seen that a binary one may be stored in the capacitor 15 by throwing a switch 20 to contact an associated terminal 22 to thereby complete a series circuit which includes the capacitor 15, the resistor 24, and a battery 26. With the switch 20 in this condition, battery 26 is effective to apply to the capacitor 15 a voltage in magnitude $+E_1$ volts, which voltage is, regardless of the initial state of the capacitor, sufficient to saturate it to the condition represented by the letter "*c*" in FIG. 1. When switch 20 is restored to its original condition contacting terminal 28 to thereby terminate the energizing pulse, the capacitor 15 assumes the remanent state of polarization indicated at "*a*." In a similar manner throwing of switch 20 to contact terminal 30 completes a circuit to a battery 27 which is effective to cause capacitor 15 to be saturated in the opposite direction to the state represented, in FIG. 1, by the letter "*d*" and, upon termination of the energizing pulse, the capacitor assumes the binary zero representing condition at point "*b*."

When it is desired to read out the information stored in the capacitor 15, an interrogation pulse is supplied by a pulse source 32. This pulse might be of the polarity shown adjacent the lead 34 through which the pulse source 32 is connected to one end of electrode 12. The other end of electrode 12 is connected to ground and thus it may be seen that the application of a pulse, by pulse source 32, causes a current to flow through the electrode 12. The current flow through the electrode 12 results in a $I^2R$ loss involving the evolution of heat which is transferred to the crystalline material 10. This application of heat to the barium titanate crystal 10 causes a pyroelectric current to flow which is indicative of the state of polarization of the memory capacitor.

Figure 2:
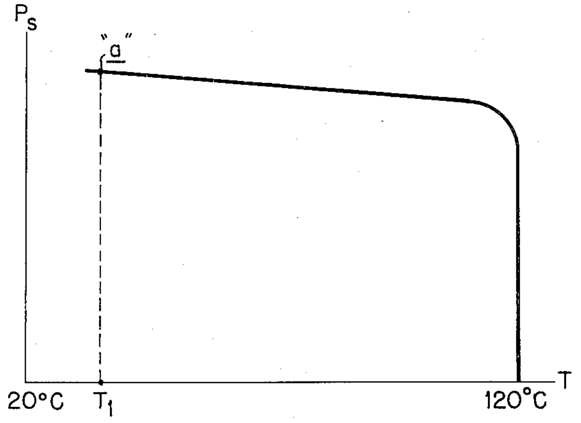
FIG. 2 is a plot showing the manner in which the spontaneous polarization of a crystal of barium titanate changes when the temperature of the crystal is changed.
Figure 3:
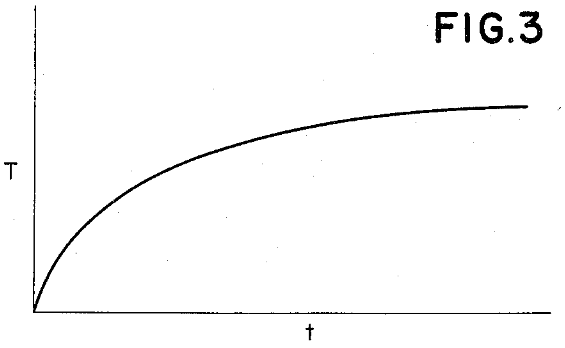
FIG. 3 is a plot indicative of the time rate of temperature change effected by the application of heat to a crystal of barium titanate.

The nature of the phenomenon producing this pyroelectric current may best be understood by a consideration of FIGS. 2 and 3. FIG. 2 is a plot of spontaneous polarization ($P_s$) versus temperature (T) for a crystal of barium titanate such as is suitable for use in practicing the present invention. The temperature designated $T_1$ in FIG. 2 is considered to be representative of room temperature at which the crystalline material 10 in the circuit of FIG. 4 normally exists. The letter "*a*" in FIG. 2 represents the spontaneous polarization at this temperature and thus corresponds to the remanent state indicated by the same letter in FIG. 1. As is shown by FIG. 2, the change in the spontaneous polarization accompanying a change of temperature is essentially constant in the room temperature range and up to a temperature of 120° C., which is the Curie temperature for the material, that is the temperature at which the material, when in an unbiased condition, loses its ferroelectric properties.

Pyroelectric current which is produced by the application of heat to change the temperature of the barium titanate is directly proportional both to the change in polarization effected by change in temperature and also to the time rate of the temperature change. The equation for the pyroelectric current ($I_p$) may be stated as follows:

$$I_p=\left(\frac{dP}{dT}\right)\left(\frac{dT}{dt}\right)A$$

where A is the electrode area. Since in the room temperature range, the change in polarization effected by a change in temperature is essentially constant as is indicated in FIG. 2, the amount of pyroelectric current produced is primarily a function of the time rate of temperature change.

Referring now to FIG. 3, it may be seen that the application of heat to a barium titanate crystal initially causes a relatively large time rate of temperature change. Since the amount of pyroelectric current produced is not dependent upon total temperature change but only upon the time rate at which the temperature of the material is changed and, as shown in FIG. 3, the time rate of temperature change is relatively high when heat is initially applied, an appreciable pyroelectric current can be produced by a relatively small amount of heat which is effective to change the temperature of the crystalline material only a slight amount.

The heat accompanying the $I^2R$ loss resulting from the flow of current through the electrode 12 is sufficient to cause a pyroelectric current to be produced in crystal 10. The direction of the flow of the pyroelectric current is dependent solely on the direction of polarization in the capacitor 10. This is so, since regardless of the initial direction of polarization in the capacitor, the application of heat is effective to reduce the spontaneous polarization in that direction. When capacitor 15 is initially in the remanent condition "*a*" representative of a binary one and thus polarized in the direction indicated by arrow 16, the pyroelectric current flows in the direction opposite to this initial state of polarization. Similarly, with the capacitor representing a binary zero and thus polarized in the direction indicated by arrow 18 the application of heat decreases the spontaneous polarization in this direction and causes current to flow in a direction opposite to the direction of initial polarization. An arrow 36, adjacent to a lead 40 connected to electrode 14, indicates the direction of current flow in the output circuit when the capacitor is interrogated when in the binary zero representing condition, and an arrow 38 indicates the direction of current flow in the output circuit resulting from an interrogation when the capacitor 15 is in the binary zero representing condition.

The output circuit extends from the barium titanate crystal 10 through the electrode 14 and lead 40 to terminal 44, and thence in parallel through a capacitor 46 to an output terminal 48, and through resistor 24 and switch 20 contacting the terminal 28 to ground. The output is developed across resistor 24, and a pulse of positive polarity is manifested at terminal 48 when capacitor 15 is interrogated when in a binary one condition and a negative pulse is manifested at output terminal 48 when memory capacitor 15 is interrogated when in a binary zero representing condition.

It should be noted that, as before stated, the direction of the current flow and thus the polarity of the output pulse developed at terminal 48 is dependent only upon the state of polarization of capacitor 15 upon the application of an interrogation pulse. Thus the pulse, supplied by pulse source 32, may be of either polarity and cause current to flow in either direction through electrode 12.

Referring now to FIG. 5, there is shown an "EXCLUSIVE OR" circuit embodying the present invention. The capacitor 15 of this figure is constructed in the same manner as that shown in FIG. 4. A pair of electrodes 12 and 14, extending at right angles to each other, are affixed to the opposite faces of the crystal 10 with the barium titanate between the electrodes at their intersection forming the dielectric of the capacitor. Inputs are selectively applied to the electrode 12 by transferring the switches 50 and 52, from the positions shown, to contact terminals 54 and 56 respectively. In the normal condition, switches 50 and 52 are contacting terminals 58 and 60 and there is no potential drop across, and no current flowing through electrode 12. If one or the other of the switches is thrown from the home position, a heating current is caused to flow in electrode 12. For example, if the switch 50 is thrown to contact terminal 54, a battery 62 is then effective to apply voltage to the input circuit which includes electrode 12, causing a heating current to flow through this electrode which is effective to produce a pyroelectric current in the crystal 10 of capacitor 15. This pyroelectric current flows through the output circuit and as in the embodiment of FIG. 4, causes an output to be developed across resistor 24 and manifested at output terminal 48. In a like manner, by transferring of switch 52 to contact terminal 56 with switch 50 remaining in the home position shown, a battery 64 is connected in the input circuit to cause a heating current to flow through electrode 12 and thus a pyroelectric current to be produced in crystal 10. This pyroelectric current is effective as before to cause an output to be manifested at terminal 48. When both of the switches 50 and 52 are coincidently closed, the batteries 62 and 64 are each connected in the circuit and there is no potential drop across electrode 12 and no heating current flows therethrough.

It should be noted that, since the direction in which the pyroelectric current flows is dependent solely upon the initial direction of spontaneous polarization in crystal 10, the "EXCLUSIVE OR" circuit of FIG. 4 is operable to produce a unipolar output at terminal 48 in response to the application of a signal of either polarity to either input, excusively. Thus, if we consider the capacitor to be initially in the remanent state in the direction indicated by arrow 16, which state is represented at "*a*" in FIG. 1, the application of a positive pulse by either of the batteries 62 or 64 is effective to produce an output current in the direction indicated by the arrow 36 adjacent lead 40, and a positive output to be developed at terminal 48. If batteries 62 and 64 are replaced by sources effective to apply voltage pulses of opposite polarity, the outputs developed at terminal 48 remain negative. Where the capacitor 15 is initially in the remanent state in the direction indicated by arrow 18, which state is represented at "*b*" in FIG. 1, the output current produced in response to the application of a signal of either polarity to either input exclusively, is as indicated by the arrow 38 and the output pulses developed at terminal 48 are negative.

Upon the termination of the input signals, whether applied exclusively or coincidently, the capacitor 15 assumes its original state of remanent polarization and thus successive inputs of either polarity may be applied to the circuit of FIG. 5 without the need of resetting. It should be noted that the "EXCLUSIVE OR" circuit of FIG. 5 is operable utilizing only the pyroelectric properties of the barium titanate, there being no need for reversing the direction of polarization in the material to accomplish this logical operation.

The circuit of FIG. 5 may be also considered as a logical memory circuit capable of storing binary information and capable of being interrogated nondestructively in response to the application of a pulse to either of a pair of interrogation terminals, exclusively. In the above described "EXCLUSIVE OR" circuit the switch 20 is maintained in the position shown except when it is desired to reverse the direction of polarization in the crystal and thereby cause output pulses of opposite polarity to be produced during succeeding logical operations. The switch 20 may, in the same manner as was described with reference to FIG. 4, be thrown to contact either terminal 22 or 30 to establish a direction of polarization in capacitor 15 which is indicative of a binary one or a binary zero. When binary information is thus stored in capacitor 15, the transferring of either switch 50 or 52, with the other switch remaining in the position shown, causes a pyroelectric current to flow and an output to be developed at terminal 48. Since the direction of flow of pyroelectric current is dependent upon the initial state of polarization of the capacitor, the polarity of the output pulse is indicative of the binary information stored in the capacitor. Where switches 50 and 52 are transferred to coincidently apply pulses of like polarity to electrode 12 there is, of course, no pyroelectric current produced and no output developed at terminal 48. In some applications it might be desired that the outputs produced as the result of interrogation of capacitor 15, in the circuits of either FIG. 4 or 5, be in the form of a pulse for one binary value and no pulse for the other binary value. In such an application, a properly poled diode may be inserted in the output circuit, for example, between junction 44 and capacitor 46.

Note should here be made of the fact that in the embodiments of both FIGS. 4 and 5 there is superimposed on the pyroelectric current a current due to the fact that the application of signals to electrode 12 causes the capacitor 15 to be subjected to an electric field. When the memory capacitor 15 of FIG. 4 is interrogated by a pulse supplied by pulse source 32, the potential of electrode 12 is raised or lowered according to the polarity of the pulse applied. There is, thus, a potential drop across capacitor 15, which drop is effective to cause a current to flow through the crystal. This current due to the potential drop across the capacitor is superimposed upon the pyroelectric current. The direction of the current due to this potential drop is, of course, dependent upon the polarity of the pulse applied by pulse source 32 and is independent of the state of polarization of the capacitor 15. When the interrogation pulses are positive, the current flow is in the direction indicated by arrow 36, and thus serves to increase the total output current when a binary one is read out of capacitor 15 and to decrease the total output current when a binary zero is read out. However, it has been found that sufficient heat can be applied to produce an easily detectable pyroelectric output current by applying interrogation pulses which, in magnitude, are much less than the coercive voltage necessary to establish an electric field of sufficient intensity to switch the capacitor from one remanent state to the other. As a result, the potential drop across the capacitor is relatively small, as indicated at $E_2$ in FIG. 1, and causes only a small excursion along the hysteresis loop such as is indicated by the segment "*ae*." It should be noted that the potential drop $E_2$ is appreciably less than half the coercive potential, indicated at $E_c$, required to switch the direction of polarization in the crystal. The current produced as a result of this excursion, during which the capacitance presented by the capacitor being proportional to the slope of the portion of the hysteresis loop traversed is relatively small, is appreciably smaller than the pyroelectric current.

A similar current due to potential drop across the capacitor is produced in the embodiment of FIG. 5, when either of the switches 50 or 56 is closed, exclusively. When the circuit of this embodiment is utilized as an "EXCLUSIVE OR" circuit the outputs are unipolar and the polarity of input pulses and the initial state of polarization may be chosen so that the pyroelectric current is always in the same direction or always in the opposite direction to the current flow caused by the potential drop across the capacitor. For example, the initial state of the capacitor may be so chosen that the potential drop increases the polarization whereas the pyroelectric effect decreases the polarization in the crystalline dielectric. When switches 50 and 52 are closed coincidently, there is, of course, no potential drop across electrode 12, and thus no heating current and no output is developed as the result of pyroelectric current flow. However, the coincident closing of switches 50 and 52 does raise the potential at electrode 12 and some current flows through the output circuit. But, as in the embodiment of FIG. 4, the magnitude of the input pulses is much less than the magnitude necessary to switch the capacitor from one remanent state to the other. As a result, the hysteresis loop is traversed only along a portion of one of the horizontal segments, such as the portion "*ae*" in FIG. 1. Since the potential drop across capacitor 15 is relatively small and since the capacitor is not switched and presents a low capacitance and thus a high impedance to this potential drop, the resulting current flow is relatively small. The output at terminal 48 developed as a result of the coincident application of input pulses to the "EXCLUSIVE OR" circuit is, as a result of the potential drop across capacitor 15, appreciably smaller than that resulting from the pyroelectric current which is caused to flow when one or the other of the inputs is pulsed exclusively.

The outputs developed as a result of the potential drop across the capacitor 15, in the embodiment of both FIGS. 4 and 5, may be minimized by shaping the electrodes in the manner shown in FIG. 6. The electrode 14 connected by lead 40 to the output circuitry may be a rectangularly shaped electrode attached to one face of crystal 10. The heating electrode is, however, shaped so that it is narrower at the point of intersection with electrode 14. It is this narrow portion **12*a* of electrode 12 and the intersecting portion of electrode 14 which, together with the barium titanate therebetween, form the ferroelectric capacitor 15. By constructing electrode 12 in the manner shown, the $I^2R$ loss at the portion 12*a* is greater for a given voltage applied across the entire electrode 12. This is due to the fact that the resistance per unit of length of the narrow portion 12*a* is greater than that of the wider portions of electrode 12, and thus a greater amount of heat can be applied to the portion of the barium titanate which forms the dielectric of the capacitor 15 with a smaller voltage than is possible where the heating electrode has a uniform resistance throughout its length. Since a smaller voltage will, with the construction of FIG. 6, produce a greater amount of heat, it can readily be seen that the outputs due to the voltage drop across the capacitor 15** are similarly reduced with a construction of this type.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A logical circuit comprising a body of material having pyroelectric properties, a pair of electrodes connected to said body, first and second input means coupled to one of said electrodes, means for energizing said first and second input means, said first and second input means when either is energized exclusively being effective to cause a current to flow through said one electrode, said current being effective to heat said one electrode and thereby said body of material to cause a pyroelectric current to flow through said material, and means coupled to the other of said electrodes for detecting said pyroelectric current.

2. A logical circuit comprising a body of ferroelectric material, a pair of electrodes connected to said body to form therewith a ferroelectric capacitor, said material having pyroelectric properties effective when said material is subjected to heat to cause a pyroelectric current to flow through said capacitor, first and second input means electrically connected to one of said electrodes, means for energizing said first and second input means, said input means being effective when either is energized exclusively to produce a current in said one electrode, said current being effective to heat said one electrode and thereby said body of ferroelectric material to cause a pyroelectric current to flow therein, and means coupled to said capacitor to detect said pyroelectric current for producing an output when either of said input means is energized exclusively.

3. A logical circuit circuit comprising a body of ferroelectric material, a pair of electrodes connected to different faces of said capacitor, said electrodes together with the ferroelectric material between them forming a capacitor capable of assuming first and second stable states of remanent polarization, first and second input means connected to opposite ends of one of the electrodes of said capacitor, means for applying to said input means signals of substantially equal magnitude and like polarity, said signals being of insufficient magnitude when applied coincidently to switch said capacitor from one of said stable states to the other, said signals being effective when applied to either one of said inputs exclusively to cause a heating current to flow through said electrode to thereby heat said material and cause a pyroelectric current to flow through said capacitor, and means connected to the other electrode of said capacitor and responsive to said pyroelectric current for producing an output when a signal is applied to either of said input means exclusively.

4. A logical circuit comprising a body of ferroelectric material having pyroelectric properties, a pair of electrodes connected to opposite faces of said body, a portion of each of said electrodes and a portion of said material between said portions of said electrodes forming a capacitor capable of assuming first and second stable states of remanent polarization, first and second input means connected to one of said electrodes to form therewith a series circuit, said portion of said one electrode being between said first and second input means in said series circuit, means for applying signals to said first and second input means, said signals being effective only when applied to one or the other of said input means exclusively to cause a current to flow through said portion of said one electrode, said current being effective to heat said one electrode and thereby said material to cause a pyroelectric current to flow through said capacitor, and means including an impedance element connected to the other of said electrodes for producing an output when a signal is applied to either of said input means exclusively.

5. A logical circuit comprising a body of dielectric material having a pair of electrodes connected thereto to form a capacitor, said material having pyroelectric properties effective when said material is subjected to heat to cause a pyroelectric current to flow through said capacitor, first and second input means coupled to said capacitor, means for energizing said first and second input means, said input means being effective only when either one is energized exclusively to heat said material and thereby cause a pyroelectric current to flow through said capacitor, and means coupled to said capacitor for producing an output when either of said input means is energized exclusively.

6. In a ferroelectric circuit, a capacitor comprising at least first and second electrodes separated by a dielectric of ferroelectric material, first and second input means connected to said first electrode at different points on said electrode, said first and second input means being individually operable to apply input signals to said circuit, and an output terminal coupled to said second electrode.

7. In a ferroelectric circuit, a capacitor comprising at least first and second electrodes separated by a dielectric of ferroelectric material, first and second signal terminals connected at different points to said first electrode, means for applying to said terminals signals of like polarity, said means being operable to apply said signals to said terminals either separately or coincidently, and output means coupled to said second electrode.

8. In a ferroelectric circuit, a single capacitor comprising first and second electrodes separated by a dielectric of ferroelectric material, said capacitor being capable of assuming at least two different stable states of remanent polarization, means coupled to said capacitor for causing it to assume one or the other of said stable states of remanent polarization and means for nondestructively interrogating said capacitor in accordance with the "EXCLUSIVE OR" logical function comprising first and second separate lead connections to said second electrode each effective when a signal is applied thereto to apply a signal to said second electrode, controllable signal applying means connected to said first lead connection for applying signals thereto, and further controllable signal applying means connected to said second lead connection for applying signals thereto.

9. An "EXCLUSIVE OR" circuit comprising a body of material having pyroelectric properties, first and second electrodes only connected to said body, first and second input terminals for said circuit separately connected to said first electrode, and an output terminal for said circuit connected to said second electrode.

10. In a memory circuit, a single ferroelectric capacitor only comprising first and second electrodes separated by a dielectric of ferroelectric material, said capacitor being capable of assuming at least two different stable states of remanent polarization, an output terminal coupled to said capacitor, first and second signal means for applying interrogation signals to said capacitor, said signal means being effective only when one or the other applies a signal exclusively to cause to be produced at said output terminal an output indicative of which of said stable states said capacitor is in.

11. In a memory circuit, a memory element capable of assuming at least two distinguishably different states, means coupled to said element for causing said element to assume one or the other of said stable states; output means coupled to said element for producing an output indicative of the state of said element when said element is interrogated, and means for interrogating said element in accordance with the "EXCLUSIVE OR" logical function comprising first and second separate signal applying means each effective to apply signals directly to said element, said output means producing an output indication of the state of said element in response to signals applied by said first and second signal applying means only when one or the other but not both of said first and second signal applying means applies a signal to said element.

12. The invention as claimed in claim 11 wherein said signals applied by first and second signal applying means are insufficient when said element is in either of said states to cause said element to assume the other of said states.

13. The invention as claimed in claim 11 wherein said first and second signal applying means comprise first and second separate leads, each of said leads being physically and directly attached to said element.

14. In a memory circuit, a memory element capable of assuming at least two different stable states and normally in one of said states, means coupled to said element for causing said element to assume the other of said states, output means coupled to said element for producing an output when said element is interrogated, at least one of the properties of said element being distinguishably different in said different stable states so that distinguishable outputs indicative of the state of said element are manifested when said element is interrogated, and means for interrogating said element in accordance with the "EXCLUSIVE OR" logical function comprising first and second signal applying means each separately coupled to said element and each effective to apply signals directly to said element, said output means producing an output indication of the state of said element in response to signals applied by said first and second signal applying means only when one or the other but not both of said first and second signal applying means applies a signal to said element.

15. In a memory circuit, a memory element capable when in an electrically unbiased condition of assuming at least two different states, at least one of the properties of said element being distinguishably different in the two different states, means coupled to said element for causing said element to assume one or the other of said states, output means coupled to said element for producing an output indicative fo the state of said element when said element is interrogated, and means for interrogating said element in accordance with the "EXCLUSIVE OR" logical function comprising a first and second signal applying means each connected directly and separately to said element and each effective to apply signals directly to said element, said output means producing an output indication of the state of said element in response to signals applied by said first and second signal applying means only when one or the other but not both of said first and second signal applying means applies a signal to said element.

16. In a memory circuit, a memory element comprising a body of a material capable when in an electrically unbiased condition of existing in two different stable states, at least one of the electrical properties of said material being distinguishably different in the two different states, means coupled to said element for causing said element to assume one or the other of said stable states, output means coupled to said element for producing an output indicative of the state of said element when said element is interrogated, and means for interrogating said element in accordance with the "EXCLUSIVE OR" logical function comprising first and second separate signal applying means each directly connected to said element and each effective to individually apply signals directly to said element, said output means producing an output indication of the state of said element in response to signals applied by said first and second signal applying means only when one or the other but not both of said first and second signal applying means applies a signal to said element.

17. A circuit comprising a body of ferroelectric material having pyroelectric properties, a pair of electrodes connected to opposite faces of said body and forming therewith a capacitor capable of being caused to assume two different stable states of remanent polarization, means coupled to said capacitor for applying thereto signals of sufficient magnitude and proper polarity to switch said capacitor between said stable states, first and second interrogation input means coupled to said capacitor for applying interrogation signals to said capacitor, said first and second interrogation input means being effective only when either applies a signal exclusively to cause a heating current to flow through at least one of said electrodes effective to produce a pyroelectric current in said capacitor, said interrogation signals being of insufficient magnitude to switch said capacitor from either of said stable states to the other, and means coupled to said capacitor and responsive to said pyroelectric current for producing an output indicative of the state of said capacitor in accordance with the direction of said pyroelectric current.

18. A logical circuit comprising a body of ferroelectric material having pyroelectric properties, a pair of electrodes connected to said body and forming therewith a memory capacitor capable of assuming first and second different stable states of remanent polarization in opposite directions, first and second input means connected to one of said electrodes, means for energizing said first and second input means, each of said first and second input means being effective only when energized exclusively to cause a current to flow through said one electrode, said current being effective to heat said one electrode and thereby said body of material to cause a pyroelectric current to flow through said material, and means coupled to the other of said electrodes for producing outputs indicative of the state of said capacitor in accordance with the direction of said pyroelectric current produced when either of said input means is energized exclusively.

References Cited in the file of this patent

UNITED STATES PATENTS

| | | |
|---|---|---|
| 2,717,356 | Foster | Sept. 6. 1955 |
| 2,717,373 | Anderson | Sept. 6, 1955 |
| 2,737,583 | Crooks et al. | Mar. 6, 1956 |
| 2,743,430 | Schulz | Apr. 24, 1956 |
| 2,773,250 | Aigrain et al. | Dec. 4, 1956 |
| 2,810,901 | Crane | Oct. 22, 1957 |
| 2,884,618 | Epstein | Apr. 28, 1959 |
| 2,926,336 | Chynoweth | Feb. 23, 1960 |

FOREIGN PATENTS

| | | |
|---|---|---|
| 664,493 | Great Britain | Jan. 9, 1952 |

OTHER REFERENCES

Piezoelectricity, by Cady, pp. 700–711, copyright 1946.

Dynamic Method for Measuring the Pyroelectric Effect with Special Reference to Barium Titanate, Journal of Applied Physics, vol. 27, No. 1, pp. 78–84, January 1956.